(12) United States Patent
Chu et al.

(10) Patent No.: US 8,983,091 B2
(45) Date of Patent: Mar. 17, 2015

(54) NETWORK SIGNAL RECEIVING SYSTEM AND NETWORK SIGNAL RECEIVING METHOD

(75) Inventors: Yuan-Jih Chu, Hsinchu (TW); Liang-Wei Huang, Hsinchu (TW); Hsuan-Ting Ho, Taichung (TW); Ming-Feng Hsu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 415 days.

(21) Appl. No.: 13/598,628

(22) Filed: Aug. 30, 2012

(65) Prior Publication Data

US 2013/0051578 A1 Feb. 28, 2013

(30) Foreign Application Priority Data

Aug. 31, 2011 (TW) .............................. 100131374 A

(51) Int. Cl.
*H04B 15/00* (2006.01)
*H04B 1/12* (2006.01)
*H04N 5/765* (2006.01)
*H04N 7/10* (2006.01)

(52) U.S. Cl.
CPC ............... *H04B 15/00* (2013.01); *H04B 1/123* (2013.01); *H04N 5/765* (2013.01); *H04N 7/102* (2013.01)
USPC ...................................................... 381/94.2

(58) Field of Classification Search
CPC ............................ H04R 3/005; G10L 21/0208
USPC ................................................ 381/94.1–94.9
See application file for complete search history.

(56) References Cited

U.S. PATENT DOCUMENTS

| 7,536,018 | B2* | 5/2009 | Onishi et al. | 381/71.8 |
| 8,644,525 | B2* | 2/2014 | Bathurst et al. | 381/92 |
| 2007/0177060 | A1* | 8/2007 | Tsuzuki | 348/625 |
| 2007/0255855 | A1* | 11/2007 | Knapp et al. | 709/248 |
| 2009/0274251 | A1* | 11/2009 | Gozen | 375/346 |
| 2012/0327181 | A1* | 12/2012 | Thapa | 348/14.08 |

FOREIGN PATENT DOCUMENTS

| CN | 1737905 A | 2/2006 |
| TW | 381398 | 2/2000 |
| TW | 200826065 | 6/2008 |
| TW | 201019677 | 5/2010 |
| TW | 201117187 | 5/2011 |

* cited by examiner

*Primary Examiner* — Simon Sing
(74) *Attorney, Agent, or Firm* — Winston Hsu; Scott Margo

(57) ABSTRACT

The disclosure provides a network signal receiving system and a network signal receiving method. The network signal receiving system comprises: a high pass filter, a canceller, and an adder. The high pass filter is utilized for performing a high pass filtering operation for an audio data signal to output at least a signal corresponding to transitions of the audio data signal, wherein the audio data signal is synchronized with a network data signal. The canceller is coupled to the high pass filter, and utilized for generating a noise cancelling signal according to the at least a signal output by the high pass filter. The adder is coupled to the canceller, utilized for receiving the network data signal and the noise cancelling signal, so as to use the noise cancelling signal to cancel at least a noise in the network data signal, which is corresponding to the at least a signal.

16 Claims, 9 Drawing Sheets

NETWORK SIGNAL RECEIVING SYSTEM AND NETWORK SIGNAL RECEIVING METHOD

BACKGROUND

1. Technical Field

The disclosure relates to a network signal receiving system and a network signal receiving method.

2. Description of the Related Art

The high definition multimedia interface (HDMI) version 1.4 has a new function named HDMI Ethernet and Audio return Channel (HEAC), where the HEAC function can make a network receiver to transmit/receive HDMI Ethernet Channel (HEC) data signals and Audio Return Channel (ARC) data signals simultaneously. Therefore, complex home network wiring can be simplified to provide a single high bandwidth and high-quality wiring in order to transfer complete images, audios, and Ethernet transmission, and achieve integration of multimedia networking applications.

In the HDMI device having HEAC function, both the HEC data and the ARC data are transmitted via two transmission cables, where the transmitted HEC data signal is a differential mode signal, and the transmitted ARC data signal is a common mode signal, as shown in FIG. 1. Ideally, an impedance of each of the two transmission cables should be 50 ohm that is defined in the HDMI specification, and the differential mode signal (i.e. the HEC data signal) can be obtained by calculating a difference between two signals of the two transmission cables at receiving ends to cancel the common mode signal (i.e. the ARC data signal).

However, if two transmission cables (TX+, TX−) utilized for transmitting the HEC data signals and the ARC data signals have poor quality, the performance and quality of the HEC data signals will be affected. For example, when the two transmission cables have different impedances, or the impedances of the two transmission cables do not match the impedances of the receiver, the amplitudes of two-halves of the received common mode signals will be different, as shown in FIG. 2. The two-halves of the common mode signal having different amplitudes will make the obtained differential mode signal have noises, and seriously reduce the performance and quality of the HEC data signals. In addition, when the two transmission cables have different delay times (i.e. a phase mismatch is existed between two signals of the two transmission cables), the phases of two-halves of the received common mode signals will be different, as shown in FIG. 3. The two-halves of the common mode signal having different phases will also make the obtained differential mode signal have noises, and seriously reduce the performance and quality of the HEC data signals.

BRIEF SUMMARY

It is therefore one of the objectives of the disclosure to provide a network signal receiving system and a network signal receiving method capable of solving the noise problems caused by poor quality of signal transmitting cables, so as to solve the above problem.

In accordance with an embodiment of the disclosure, a network signal receiving system is disclosed. The network signal receiving system comprises: a high pass filter, a canceller, and an adder. The high pass filter is utilized for performing a high pass filtering operation for an audio data signal to output at least a signal corresponding to transitions of the audio data signal, wherein the audio data signal is synchronized with a network data signal. The canceller is coupled to the high pass filter, and utilized for generating a noise cancelling signal according to the at least a signal output by the high pass filter. The adder is coupled to the canceller, and utilized for receiving the network data signal and the noise cancelling signal, so as to use the noise cancelling signal to cancel at least a noise in the network data signal, which is corresponding to the at least a signal.

In accordance with an embodiment of the disclosure, a network signal receiving method is disclosed. The network signal receiving method comprises: performing a high pass filtering operation for an audio data signal to output at least a signal corresponding to transitions of the audio data signal, wherein the audio data signal is synchronized with a network data signal; generating a noise cancelling signal according to the at least a signal output by the high pass filter; and using the noise cancelling signal to cancel at least a noise in the network data signal, which is corresponding to the at least a signal.

Briefly summarized, the network signal receiving system and the network signal receiving method disclosed by the disclosure are capable of solving the noise problems of caused by poor quality of signal transmitting cables. In addition, since the network signal receiving system and the network signal receiving method of the disclosure utilize a high pass filter to perform a high pass filtering operation for an audio data signal to output at least a signal corresponding to transitions of the audio data signal, the network signal receiving system and the network signal receiving method of the disclosure can generate a noise cancelling signal when there is at least a noise occurring.

These and other objectives of the disclosure will no doubt become obvious to those of ordinary skill in the art after reading the following detailed description of the preferred embodiment that is illustrated in the various figures and drawings.

DETAILED DESCRIPTION

Figure 1:
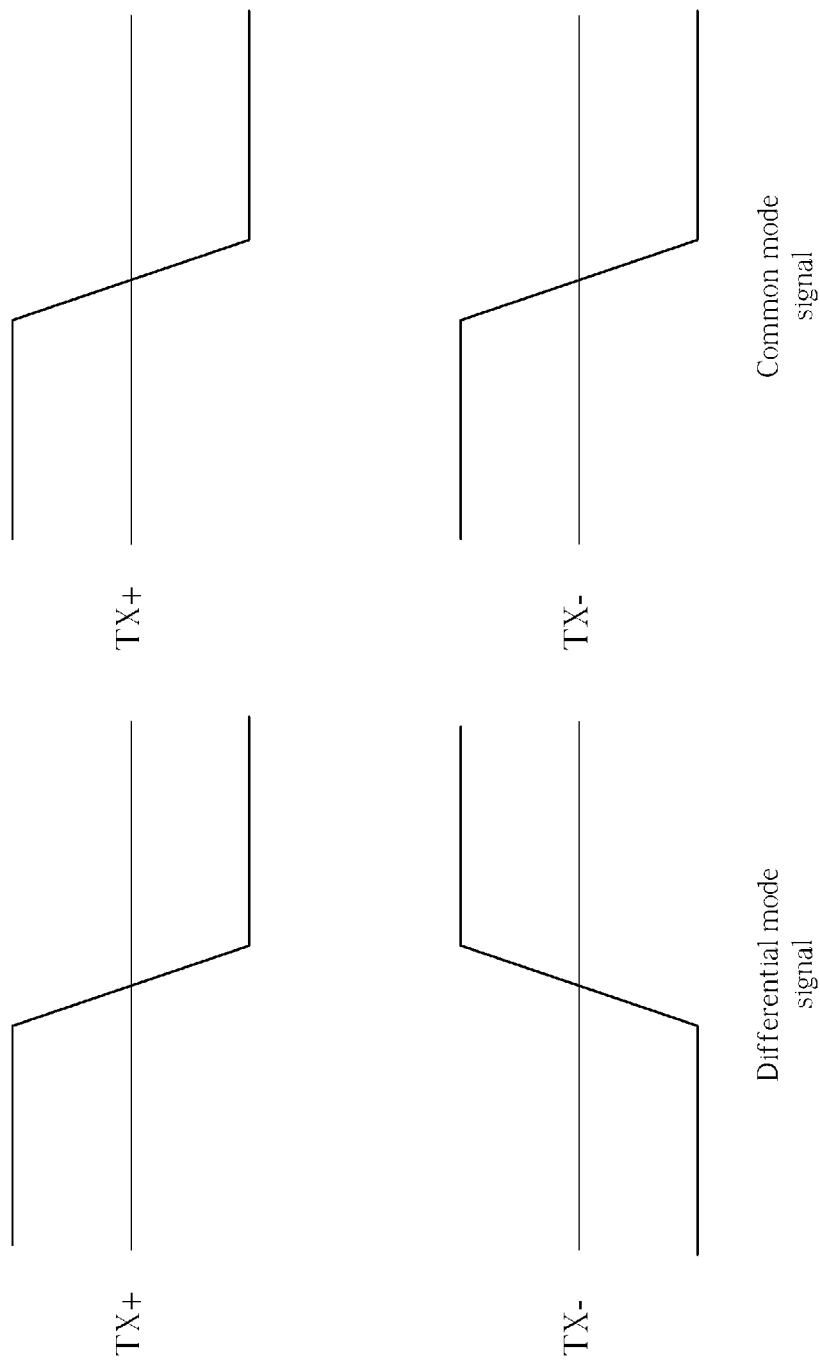
FIG. 1 shows timing diagrams of an ideal common mode signal and an ideal differential mode signal.
Figure 2:
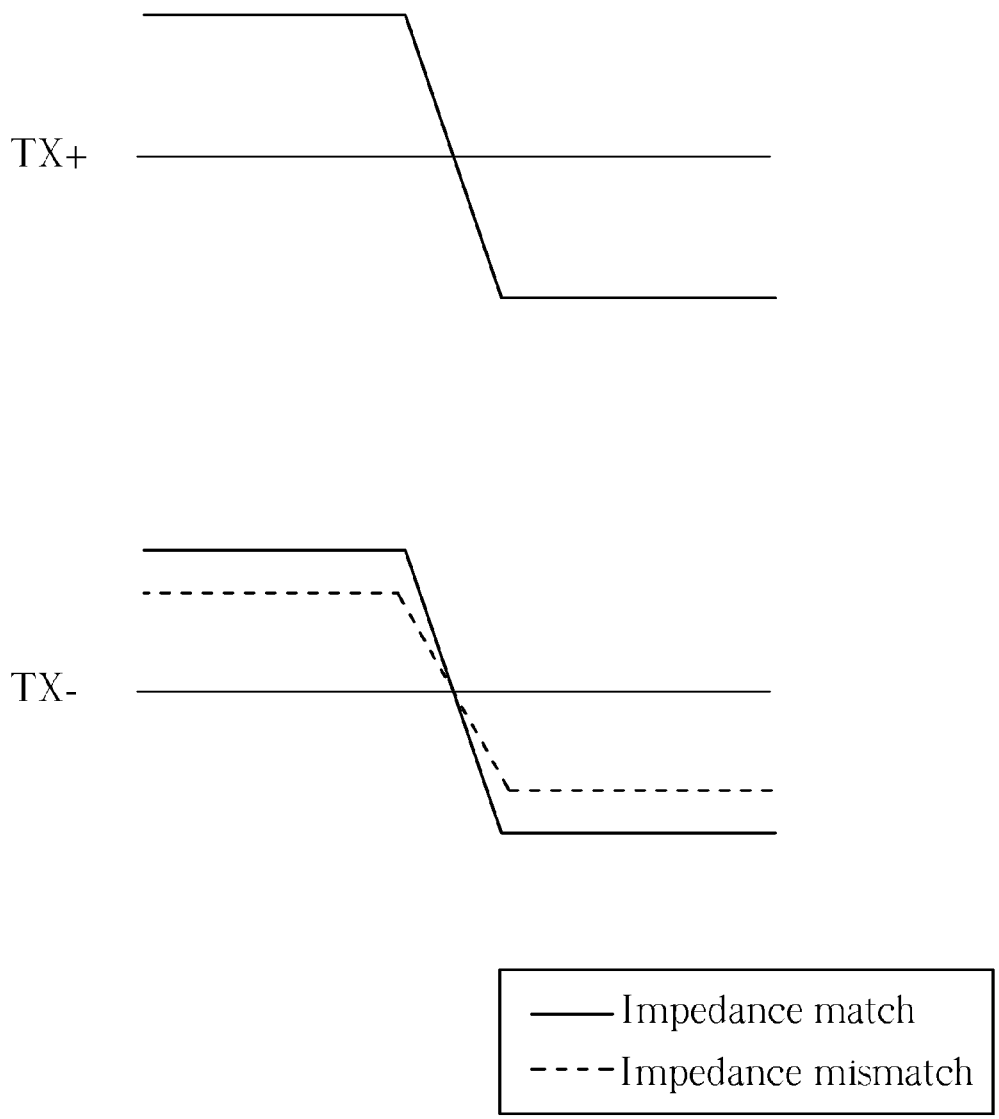
FIG. 2 shows a timing diagram of a common mode signal carried on two transmission cables when impedances of the two transmission cables are mismatched.
Figure 3:
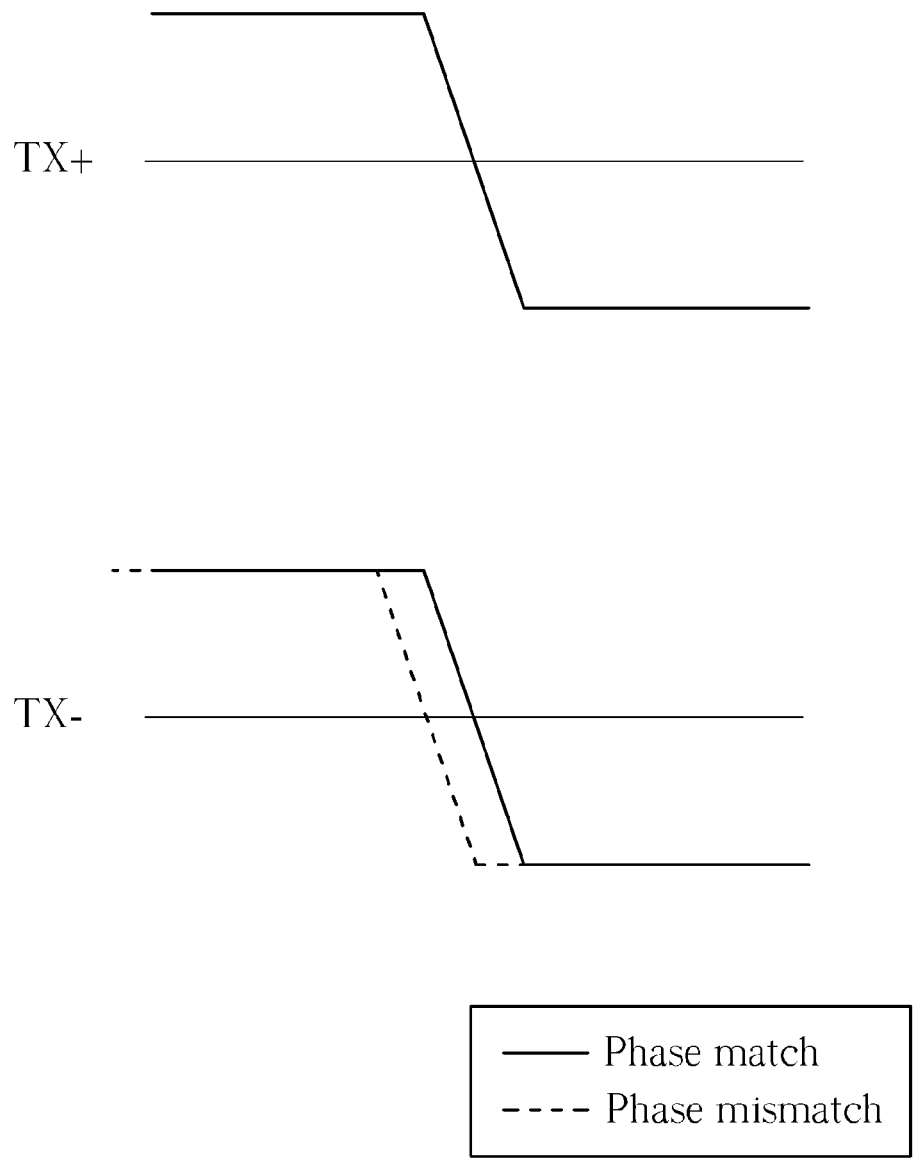
FIG. 3 shows a timing diagram of a common mode signal carried on two transmission cables when phases of the two transmission cables are mismatched.
Figure 4:
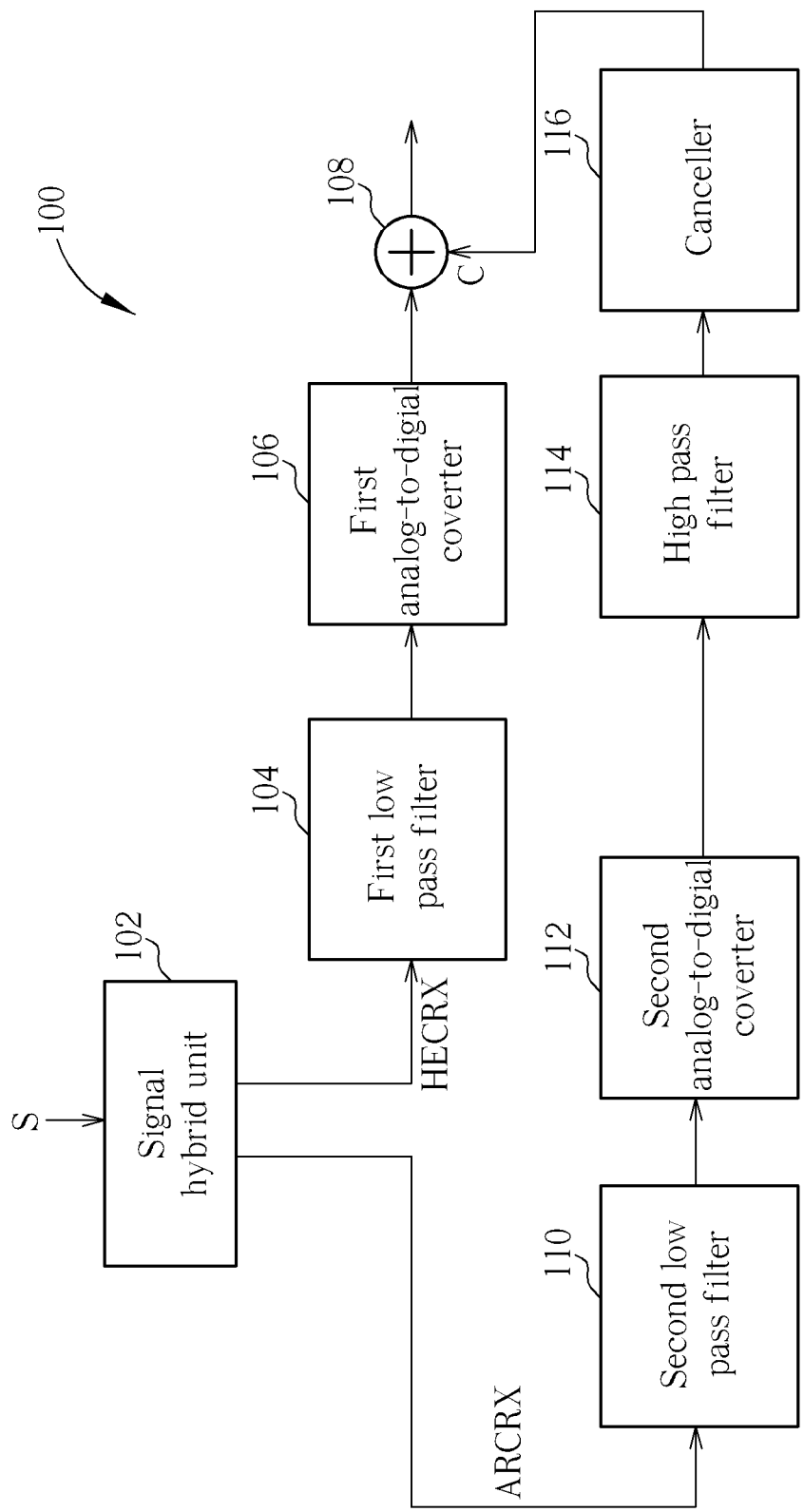
FIG. 4 shows a simplified block diagram of a network signal receiving system in accordance with a first embodiment of the disclosure.

Please refer to FIG. 4. FIG. 4 shows a simplified block diagram of a network signal receiving system 100 in accordance with a first embodiment of the disclosure, wherein the network signal receiving system 100 is a high definition multimedia interface (HDMI) system, and the HDMI system conforms to the HDMI 1.4 specification. As shown in FIG. 4, the network signal receiving system 100 comprises: a signal hybrid unit 102, a first low pass filter 104, a first analog-to-digital converter 106, an adder 108, a second low pass filter 110, a second analog-to-digital converter 112, a high pass filter 114, and a canceller 116. In this embodiment, the network signal receiving system 100 is applied to a signal receiving terminal (such as a TV or a display device with a speaker), and thus the data signal S in FIG. 4 comprises an audio receiving data signal and a network receiving data signal, wherein the audio receiving data signal can be an audio return channel (ARC) receiving data signal, and the network receiving data signal can be an HDMI ethernet channel (HEC) receiving data signal. An audio receiving data signal ARCRX and a network receiving data signal HECRX will be respectively generated after the data signal S is processed by the signal hybrid unit 102. As stated in the Description of the Prior Art, when the signal transmitting cables have poor quality, there will be noises caused by the audio receiving data signal ARCRX occurring in the network receiving data signal HECRX. Thus, the disclosure utilizes the second low pass filter 110 to perform a low pass filtering operation for the audio receiving data signal ARCRX first, and then utilizes the second analog-to-digital converter 112 to perform an analog-to-digital operation for the audio receiving data signal ARCRX, and make the audio receiving data signal ARCRX synchronized with the network receiving data signal HECRX. Next, the high pass filter 114 is utilized for performing a high pass filtering operation for the audio receiving data signal ARCRX to output at least a signal corresponding to transitions of the audio receiving data signal ARCRX, wherein the high pass filter 114 can be a 1-D filter or other filters having similar functions. Next, the canceller 116 is utilized for generating a noise cancelling signal C according to the at least a signal output by the high pass filter 114, and the adder 108 is utilized for receiving the network receiving data signal HECRX and the noise cancelling signal C that have been processed by the first analog-to-digital converter 106, so as to use the noise cancelling signal C to cancel at least a noise in the network receiving data signal HECRX, wherein the at least a noise is corresponding to the at least a signal of the transitions of the audio receiving data signal ARCRX. Please note that the above embodiment is only for an illustrative purpose and is not meant to be a limitation of the disclosure. For example, the second low pass filter 110 can be omitted according to different design requirements and specific conditions.

Figure 5:
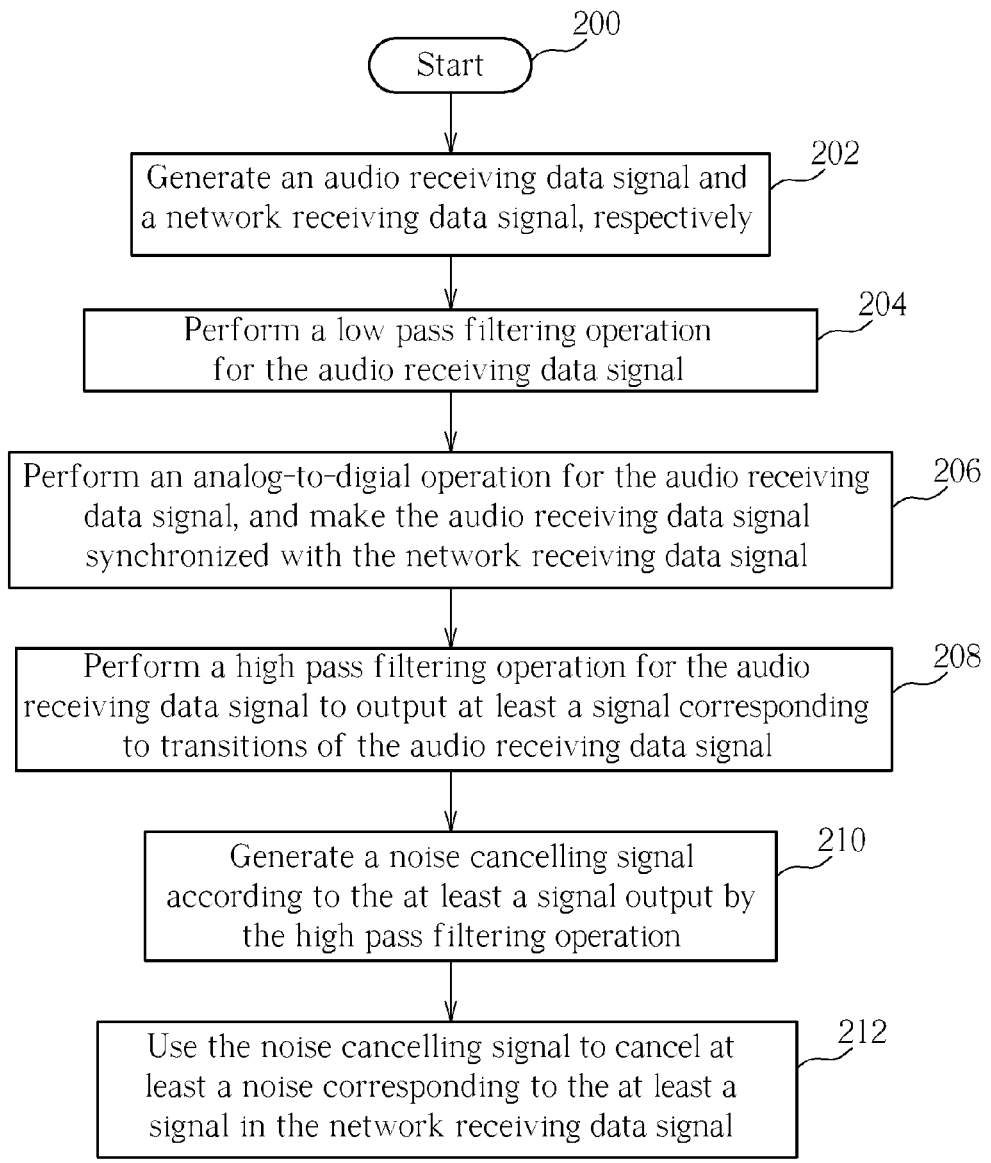
FIG. 5 shows a first exemplary flowchart of the disclosure showing a network signal receiving method in accordance with the operations of the network signal receiving system in FIG. 4.

Please refer to FIG. 5. FIG. 5 shows a first exemplary flowchart of the disclosure showing a network signal receiving method in accordance with the above operations of the network signal receiving system 100. Provided that substantially the same result is achieved, the steps of the process flowchart do not have to be in the exact order shown in FIG. 5 and need not be contiguous, meaning that other steps can be intermediate. The network signal receiving method of the disclosure comprises the following steps:

Step 200: Start.

Step 202: Generate an audio receiving data signal and a network receiving data signal, respectively.

Step 204: Perform a low pass filtering operation for the audio receiving data signal.

Step 206: Perform an analog-to-digital operation for the audio receiving data signal, and make the audio receiving data signal synchronized with the network receiving data signal.

Step 208: Perform a high pass filtering operation for the audio receiving data signal to output at least a signal corresponding to transitions of the audio receiving data signal.

Step 210: Generate a noise cancelling signal according to the at least a signal output by the high pass filtering operation.

Step 212: Use the noise cancelling signal to cancel at least a noise corresponding to the at least a signal in the network receiving data signal.

Please note that the above embodiment is only for an illustrative purpose and is not meant to be a limitation of the disclosure. For example, the Step 204 can be omitted according to different design requirements and specific conditions, and the high pass filtering operation can be a 1-D filtering operation or other filtering operations having similar functions.

Figure 6:
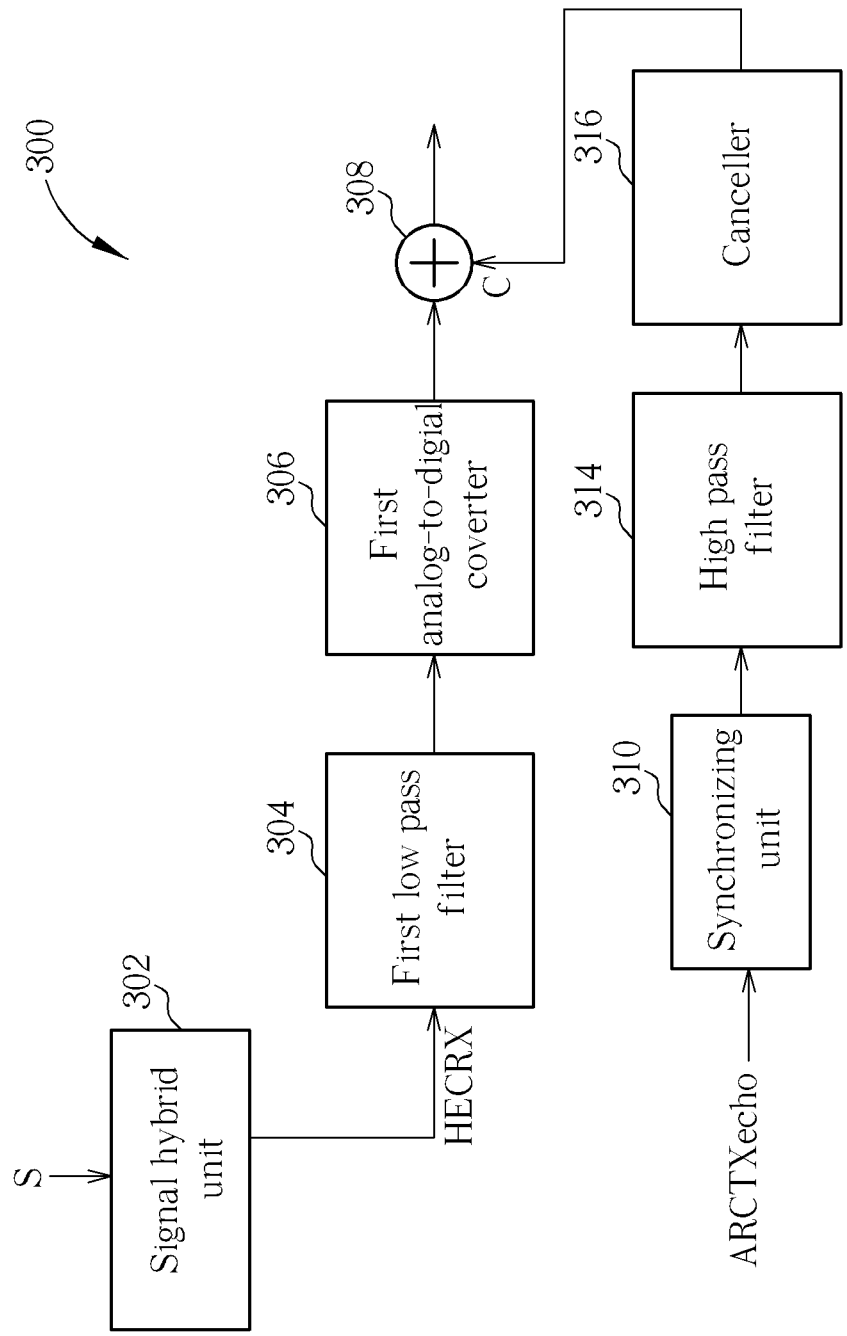
FIG. 6 shows a simplified block diagram of a network signal receiving system in accordance with a second embodiment of the disclosure.

Please refer to FIG. 6. FIG. 6 shows a simplified block diagram of a network signal receiving system 300 in accordance with a second embodiment of the disclosure, wherein the network signal receiving system 300 is a HDMI system, and the HDMI system conforms to the HDMI 1.4 specification. As shown in FIG. 6, the network signal receiving system 300 comprises: a signal hybrid unit 302, a first low pass filter 304, a first analog-to-digital converter 306, an adder 308, a synchronizing unit 310, a high pass filter 314, and a canceller 316. In this embodiment, the network signal receiving system 300 is applied to a signal source terminal (for example, a multi-media player such as a DVD player or a BD player), and thus the data signal S in FIG. 6 comprises an echo signal of an audio transmitting data signal and a network receiving data signal, wherein the audio transmitting data signal can be an audio return channel (ARC) transmitting data signal, and the network receiving data signal can be an HDMI ethernet channel (HEC) receiving data signal. An echo signal ARCTXecho of an audio transmitting data signal and a network receiving data signal HECRX will be respectively generated after the data signal S is processed by the signal hybrid unit 302. As stated in the Description of the Prior Art, when the signal transmitting cables have poor quality, there will be noises caused by the echo signal ARCTXecho occurring in the network receiving data signal HECRX. Thus, the disclosure utilizes the synchronizing unit 310 to make the echo signal ARCTXecho synchronized with the network receiving data signal HECRX first, and then utilizes the high pass filter 314 to for perform a high pass filtering operation for the echo signal ARCTXecho to output at least a signal corresponding to transitions of the echo signal ARCTXecho, wherein the high pass filter 314 can be a 1-D filter or other filters having similar functions. Next, the canceller 316 is utilized for generating a noise cancelling signal C according to the at least a signal output by the high pass filter 314, and the adder 308 is utilized for receiving the network receiving data signal HECRX and the noise cancelling signal C that have been processed by the first analog-to-digital converter 306, so as to use the noise cancelling signal C to cancel at least a noise in the network receiving data signal HECRX, wherein the at least a noise is corresponding to the at least a signal of the transitions of the echo signal ARCTXecho. Please note that the above embodiment is only for an illustrative purpose and is not meant to be a limitation of the disclosure. For example, the synchronizing unit 310 can be omitted when the echo signal ARCTXecho is originally synchronized with the network receiving data signal HECRX.

Figure 7:
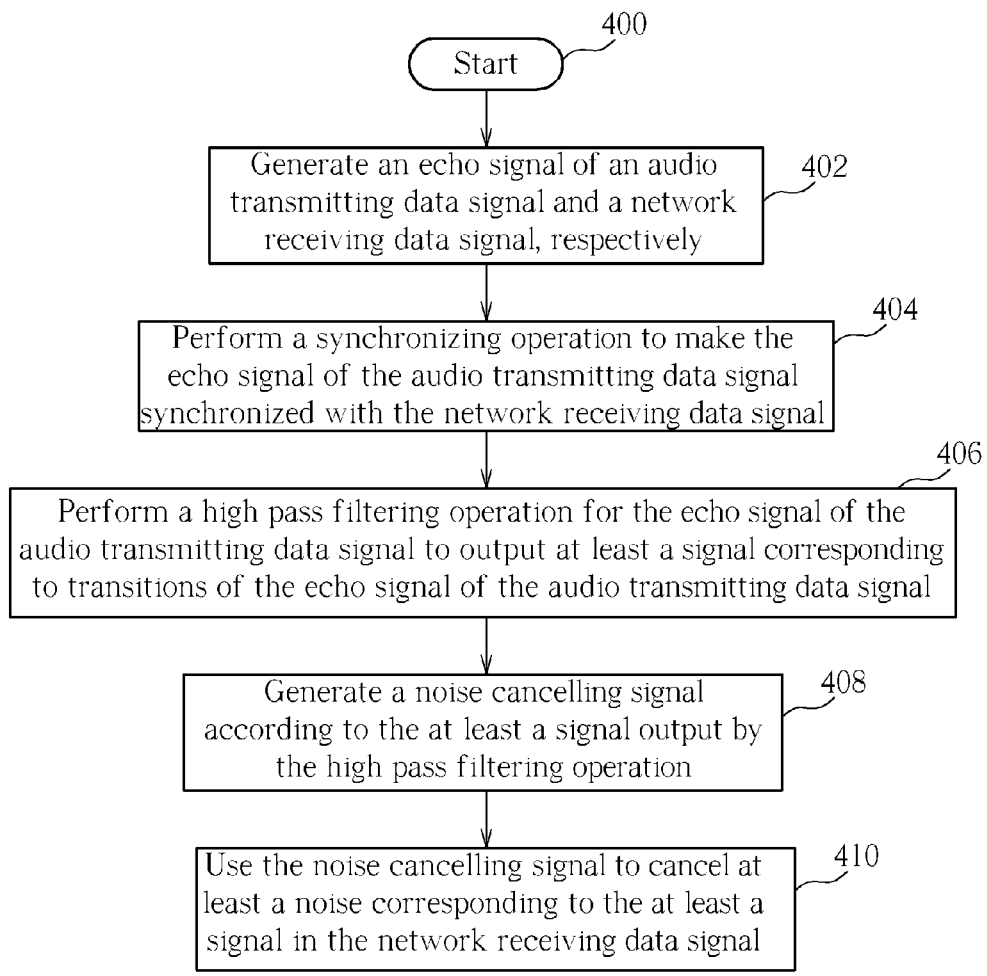
FIG. 7 shows a second exemplary flowchart of the disclosure showing a network signal receiving method in accordance with the operations of the network signal receiving system FIG. 6.

Please refer to FIG. 7. FIG. 7 shows a second exemplary flowchart of the disclosure showing a network signal receiving method in accordance with the above operations of the network signal receiving system 300. Provided that substantially the same result is achieved, the steps of the process flowchart do not have to be in the exact order shown in FIG. 7 and need not be contiguous, meaning that other steps can be intermediate. The network signal receiving method of the disclosure comprises the following steps:

Step 400: Start.

Step 402: Generate an echo signal of an audio transmitting data signal and a network receiving data signal, respectively.

Step 404: Perform a synchronizing operation to make the echo signal of the audio transmitting data signal synchronized with the network receiving data signal.

Step 406: Perform a high pass filtering operation for the echo signal of the audio transmitting data signal to output at least a signal corresponding to transitions of the echo signal of the audio transmitting data signal.

Step 408: Generate a noise cancelling signal according to the at least a signal output by the high pass filtering operation.

Step 410: Use the noise cancelling signal to cancel at least a noise corresponding to the at least a signal in the network receiving data signal.

Please note that the above embodiment is only for an illustrative purpose and is not meant to be a limitation of the disclosure. For example, the Step 204 can be omitted when the echo signal of the audio transmitting data signal is originally synchronized with the network receiving data signal, and the high pass filtering operation can be a 1-D filtering operation or other filtering operations having similar functions.

Figure 8:
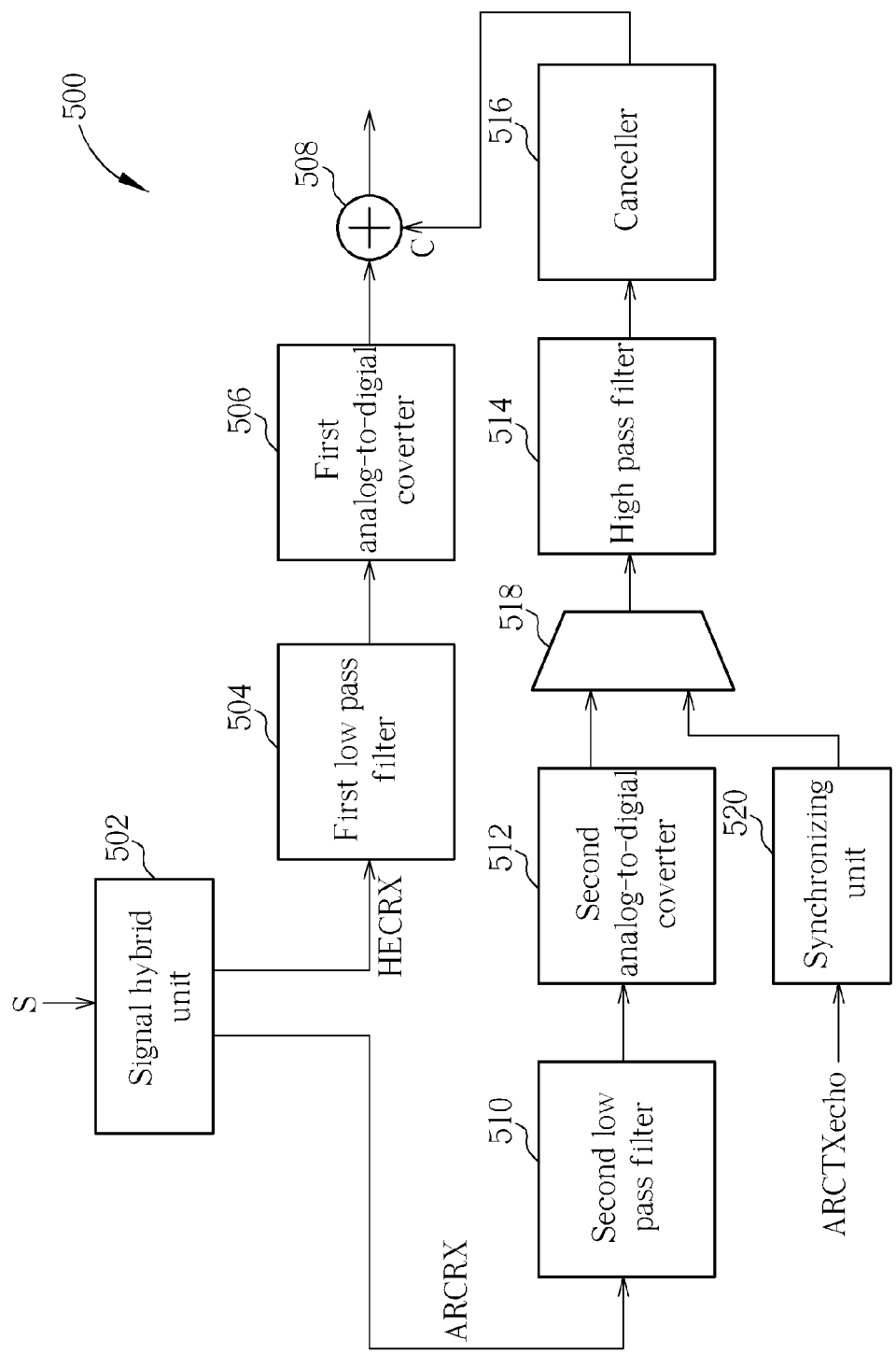
FIG. 8 shows a simplified block diagram of a network signal receiving system in accordance with a third embodiment of the disclosure.

Please refer to FIG. 8. FIG. 8 shows a simplified block diagram of a network signal receiving system 500 in accordance with a third embodiment of the disclosure, wherein the network signal receiving system 500 is a high definition multimedia interface (HDMI) system, and the HDMI system conforms to the HDMI 1.4 specification. As shown in FIG. 4, the network signal receiving system 500 comprises: a signal hybrid unit 502, a first low pass filter 504, a first analog-to-digital converter 506, an adder 508, a second low pass filter 510, a second analog-to-digital converter 512, a high pass filter 514, a canceller 516, a multiplexer 518, and a synchronizing unit 520. In this embodiment, the network signal receiving system 500 can be applied to a signal receiving terminal (such as a TV or a display device with a speaker) or a signal source terminal (for example, a multi-media player such as a DVD player or a BD player), and thus the data signal S in FIG. 4 can comprise an audio receiving data signal and a network receiving data signal, or comprise an echo signal of an audio transmitting data signal and a network receiving data signal, wherein the audio receiving data signal can be an audio return channel (ARC) receiving data signal, the audio transmitting data signal can be an ARC transmitting data signal, and the network receiving data signal can be an HDMI ethernet channel (HEC) receiving data signal. In this embodiment, the multiplexer 518 is utilized for combining the circuit schemes in the first embodiment and the second embodiment of the disclosure, and thus further explanation of the configuration details of the same elements in this embodiment, the first embodiment, and the second embodiment of the disclosure are omitted herein for the sake of brevity.

In this embodiment, when multiplexer 518 chooses to receive an echo signal ARCTXecho of an audio transmitting data signal synchronized with the network receiving data signal HECRX, the high pass filter 514 is utilized for filtering the echo signal ARCTXecho to output at least a signal corresponding to transitions of the echo signal ARCTXecho, wherein the high pass filter 514 can be a 1-D filter or other filters having similar functions. Next, the canceller 516 is utilized for generating a noise cancelling signal C according to the at least a signal output by the high pass filter 514, and the adder 508 is utilized for receiving the network receiving data signal HECRX and the noise cancelling signal C that have been processed by the first analog-to-digital converter 506, so as to use the noise cancelling signal C to cancel at least a noise in the network receiving data signal HECRX, wherein the at least a noise is corresponding to the at least a signal of the transitions of the echo signal ARCTXecho. When the multiplexer 518 chooses to receive the audio receiving data signal ARCRX, the high pass filter 514 is utilized for filtering the audio receiving data signal ARCRX to output at least a signal corresponding to transitions of the audio receiving data signal ARCRX. Next, the canceller 516 is utilized for generating a noise cancelling signal C according to the at least a signal output by the high pass filter 514, and the adder 508 is utilized for receiving the network receiving data signal HECRX and the noise cancelling signal C that have been processed by the first analog-to-digital converter 506, so as to use the noise cancelling signal C to cancel at least a noise in the network receiving data signal HECRX, wherein the at least a noise is corresponding to the at least a signal of the transitions of the audio receiving data signal ARCRX. Please note that the above embodiment is only for an illustrative purpose and is not meant to be a limitation of the disclosure. For example, the second low pass filter 510 can be omitted when the echo signal ARCTXecho is originally synchronized with the network receiving data signal HECRX.

Figure 9:
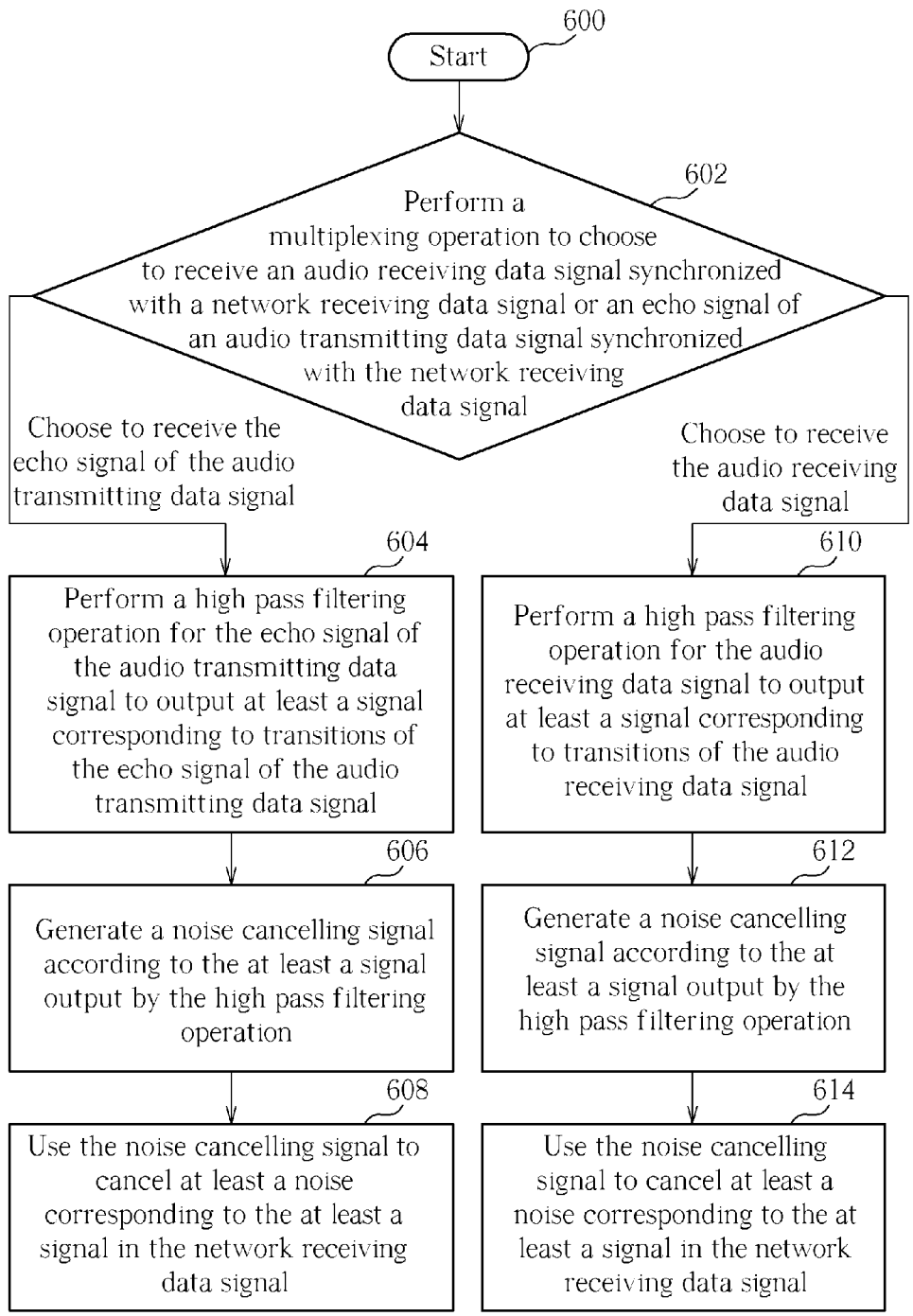
FIG. 9 shows a third exemplary flowchart of the disclosure showing a network signal receiving method in accordance with the operations of the network signal receiving system FIG. 8.

Please refer to FIG. 9. FIG. 9 shows a third exemplary flowchart of the disclosure showing a network signal receiving method in accordance with the above operations of the network signal receiving system 500. Provided that substantially the same result is achieved, the steps of the process flowchart do not have to be in the exact order shown in FIG. 9 and need not be contiguous, meaning that other steps can be intermediate. The network signal receiving method of the disclosure comprises the following steps:

Step 600: Start.

Step 602: Perform a multiplexing operation to choose to receive an audio receiving data signal synchronized with a network receiving data signal or an echo signal of an audio transmitting data signal synchronized with the network receiving data signal; if the multiplexing operation chooses to receive the echo signal of the audio transmitting data signal, then perform Step 604; and if the multiplexing operation chooses to receive the audio receiving data signal, then perform Step 610.

Step 604: Perform a high pass filtering operation for the echo signal of the audio transmitting data signal to output at least a signal corresponding to transitions of the echo signal of the audio transmitting data signal.

Step 606: Generate a noise cancelling signal according to the at least a signal output by the high pass filtering operation.

Step 608: Use the noise cancelling signal to cancel at least a noise corresponding to the at least a signal in the network receiving data signal.

Step 610: Perform a high pass filtering operation for the audio receiving data signal to output at least a signal corresponding to transitions of the audio receiving data signal.

Step 612: Generate a noise cancelling signal according to the at least a signal output by the high pass filtering operation.

Step 614: Use the noise cancelling signal to cancel at least a noise corresponding to the at least a signal in the network receiving data signal.

Briefly summarized, the network signal receiving system and the network signal receiving method disclosed by the disclosure are capable of solving the noise problems of caused by poor quality of signal transmitting cables. In addition, since the network signal receiving system and the network signal receiving method of the disclosure utilize a high pass filter to perform a high pass filtering operation for an audio data signal to output at least a signal corresponding to transitions of the audio data signal, the network signal receiving system and the network signal receiving method of the disclosure can generate a noise cancelling signal when there is at least a noise occurring.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network signal receiving system, comprising:
    a high pass filter, for performing a high pass filtering operation for an audio data signal to output at least a signal corresponding to transitions of the audio data signal, wherein the audio data signal is synchronized with a network data signal;
    a canceller, coupled to the high pass filter, for generating a noise cancelling signal according to the at least a signal output by the high pass filter; and
    an adder, coupled to the canceller, for receiving the network data signal and the noise cancelling signal, so as to use the noise cancelling signal to cancel at least a noise in the network data signal, which is corresponding to the at least a signal.

2. The network signal receiving system of claim 1, further comprising:
    an analog-to-digital converter, positioned in a front stage of the high pass filter, wherein when the audio data signal is an audio receiving data signal and the network data signal is a network receiving data signal, the analog-to-digital converter is utilized for performing an analog-to-digital operation for the audio receiving data signal, and making the audio receiving data signal synchronized with the network receiving data signal.

3. The network signal receiving system of claim 2, further comprising:
    a low pass filter, positioned in a front stage of the analog-to-digital converter, for performing a low pass filtering operation for the audio receiving data signal.

4. The network signal receiving system of claim 2, further comprising:
    a multiplexer, coupled between the analog-to-digital converter and the high pass filter;
    wherein when the multiplexer chooses to receive an echo signal of an audio transmitting data signal synchronized with the network receiving data signal, the high pass filter is utilized for filtering the echo signal to output at least a signal corresponding to transitions of the echo signal; and when the multiplexer chooses to receive the audio receiving data signal, the high pass filter is utilized for filtering the audio receiving data signal to output at least a signal corresponding to transitions of the audio receiving data signal.

5. The network signal receiving system of claim 4, further comprising:
    a synchronizing unit, positioned in a front stage of the multiplexer, for making the echo signal of the audio transmitting data signal synchronized with the network receiving data signal.

6. The network signal receiving system of claim 1, further comprising:
    a synchronizing unit, positioned in a front stage of the high pass filter, wherein when the audio data signal is an echo signal of an audio transmitting data signal and the network data signal is a network receiving data signal, the synchronizing unit is utilized for making the echo signal of the audio transmitting data signal synchronized with the network receiving data signal.

7. The network signal receiving system of claim 1, wherein the network signal receiving system is a high definition multimedia interface (HDMI) system, the audio data signal is an audio return channel (ARC) data signal, and the network data signal is an HDMI ethernet channel (HEC) data signal.

8. The network signal receiving system of claim 1, wherein the high pass filter is a 1-D filter.

9. A network signal receiving method, comprising:
    performing a high pass filtering operation for an audio data signal to output at least a signal corresponding to transitions of the audio data signal, wherein the audio data signal is synchronized with a network data signal;
    generating a noise cancelling signal according to the at least a signal output by the high pass filter; and
    using the noise cancelling signal to cancel at least a noise in the network data signal, which is corresponding to the at least a signal.

10. The network signal receiving method of claim 9, wherein before the step of outputting the at least a signal corresponding to the transitions of the audio data signal, the network signal receiving method further comprises:
    when the audio data signal is an audio receiving data signal and the network data signal is a network receiving data signal, performing an analog-to-digital operation for the audio receiving data signal, and making the audio receiving data signal synchronized with the network receiving data signal.

11. The network signal receiving method of claim 10, wherein before the step of performing the analog-to-digital operation for the audio receiving data signal, and making the audio receiving data signal synchronized with the network receiving data signal, the network signal receiving method further comprises:
    performing a low pass filtering operation for the audio receiving data signal.

12. The network signal receiving method of claim 10, further comprising:
    performing a multiplexing operation to choose to receive the audio receiving data signal synchronized with the network receiving data signal or an echo signal of an audio transmitting data signal synchronized with the network receiving data signal;
    wherein when the multiplexing operation chooses to receive an echo signal of an audio transmitting data signal synchronized with the network receiving data signal, performing the high pass filtering operation for the echo signal to output at least a signal corresponding to transitions of the echo signal; and when the multiplexing operation chooses to receive the audio receiving data signal, performing the high pass filtering operation for the audio receiving data signal to output at least a signal corresponding to transitions of the audio receiving data signal.

13. The network signal receiving method of claim 12, wherein before the step of performing the multiplexing operation to choose to receive the audio receiving data signal synchronized with the network receiving data signal or the echo signal of the audio transmitting data signal synchronized with the network receiving data signal, the network signal receiving method further comprises:

performing a synchronizing operation to make the echo signal of the audio transmitting data signal synchronized with the network receiving data signal.

14. The network signal receiving method of claim 9, wherein before the step of performing the high pass filtering operation for the audio data signal to output at least a signal corresponding to the transitions of the audio data signal, the network signal receiving method further comprises:

when the audio data signal is an echo signal of an audio transmitting data signal and the network data signal is a network receiving data signal, performing a synchronizing operation to make the echo signal of the audio transmitting data signal synchronized with a network receiving data signal.

15. The network signal receiving method of claim 9, wherein the audio data signal is an audio return channel (ARC) data signal, and the network data signal is an HDMI ethernet channel (HEC) data signal.

16. The network signal receiving system of claim 9, wherein the high pass filtering operation is a 1-D filtering operation.

* * * * *